O. B. CARSON.
GUARD FACING.
APPLICATION FILED JUNE 4, 1915.
1,249,718.
Patented Dec. 11, 1917.
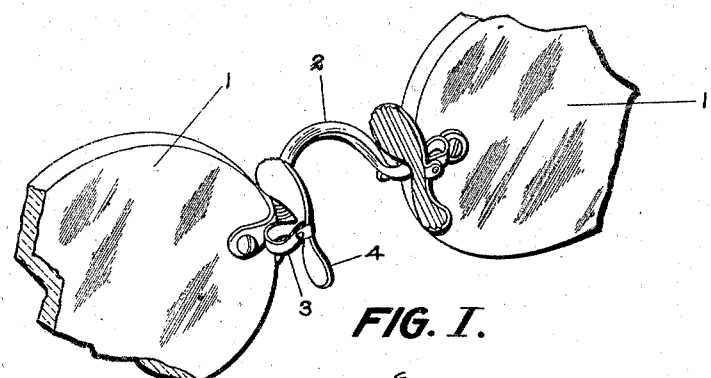
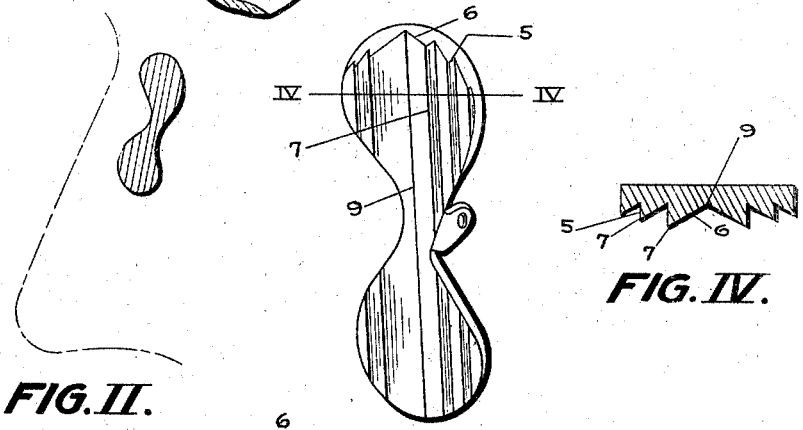
INVENTOR
OSWALD B. CARSON
BY
H. H. Styll & H. H. Parsons
ATTORNEYS

UNITED STATES PATENT OFFICE.

OSWALD B. CARSON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

GUARD-FACING.

1,249,718.      Specification of Letters Patent.      Patented Dec. 11, 1917.

Application filed June 4, 1915. Serial No. 32,074.

*To all whom it may concern:*

Be it known that I, OSWALD B. CARSON, a citizen of the United States, residing at Southbridge, in the county of Worcester and State of Massachusetts, have invented certain new and useful Improvements in Guard-Facings, of which the following is a specification.

This invention relates to an improved construction of eyeglass guard, and more particularly to that class of guards which are actuated by spring pressure to hold the glasses upon the nose.

The principal object of the invention is to provide a guard which will securely hold the glasses in adjusted position on the nose, and which will positively prevent any tilting or rolling movement thereof when the same are in adjusted position.

The invention consists in the novel features of construction as will be hereinafter more fully described, illustrated in the accompanying drawings, and claimed.

In the drawings:

Figure I is a fragmentary view of a pair of eyeglasses showing the improved guard applied thereto.

Fig. II is an inner face view of one of the guards showing the application of the same to the nose.

Fig. III is an enlarged detail perspective view of the inner face of one of the guards.

Fig. IV is a transverse sectional view on the line IV—IV of Fig. III.

Fig. V is a face view of a slightly modified form of guard.

The present invention aims to overcome the great difficulty heretofore experienced in securing a guard which will efficiently operate to hold the lenses of eyeglasses in correct position before the eyes of the wearer, and to provide a novel construction of guard whereby any tilting or rolling movement of the glasses upon the nose will be positively prevented.

It is a well known fact that as eyeglasses tilt to fall off the nose they swing from a center of pivotance which is usually located at or near the lens clip or point of connection of the bridge with the lenses so that during the tilting movement the lower portion of the guard swings rearwardly or toward the face of the wearer of the glasses, while the upper portion of the guard swings in an outward direction or away from the face of the wearer, this action being caused by the greater weight of the glasses being disposed outwardly of the center of gravity of their securing point upon the nose.

On the other hand when the mounting is so fitted that the guards at the upper portion satisfactorily grip the nose and the wearer leans forward it will sometimes occur that the bottom of the guards will tend to slip directly forwardly or forwardly and upwardly on the nose swinging more about the upper part of the guards as pivot centers. In order to overcome these defects I, therefore, employ my improved guard, such as shown in the accompanying drawings.

In the drawings I have illustrated a fingerpiece type of mounting and guards for use in connection therewith, but they are equally applicable to stud or other form of eyeglasses as desired. In this form of construction, however, the lenses 1 are shown as connected by the bridge 2 bearing at its ends the guard arms 3 provided with blades designated as an entirety by the numeral 4.

In Figs. I to III, I have shown the blades 4 as having the teeth extending the entire length thereof, said teeth comprising the straight edges or corners 7 and the angled faces 6 adapted to contact with the face of the wearer, a relatively short, directly inwardly extending portion 5 connecting the edge or corner 7 with the base of the adjacent teeth.

In Fig. V, I have illustrated a slightly modified form of guard in which the teeth or corrugations in place of being continuous are separated into upper and lower pads. In all of the forms of my invention, however, I have shown the teeth as formed substantially like those of a rip-saw, namely with the straight faces 5 and the gradually inclined faces 6 providing the sharp edges 7 disposed in the direction in which it is feared the guard may slip. Inasmuch as my improvement is especially adaptable for use in guarding against the double movement of the lower part of the guard, I have formed the entire blade with a central groove, which is bounded at each edge by oppositely faced teeth and to supplement these oppositely faced flanking teeth with portions extending diagonally from the base of the adjacent teeth and with their outer faces substantially normal to the surface of the nose, whereby a central nose engaging portion is provided comprising the groove designated as 9, flanged by a plurality of teeth having a biting action to engage the nose and resist movement of the guard in either direction upon the nose. This construction should be understood by reference to Fig. III, and more particularly to the sectional view in Fig. IV.

From the foregoing description taken in connection with the accompanying drawings, it is thought that the construction and operation of the guard will be clearly understood, and while I have herein shown and described certain embodiments of my invention, I do not wish to be limited thereto except to such limitations as the claim may import.

I claim:

A nose guard, having a central groove formed therein bounded at each edge by oppositely faced teeth having their sides distant from the groove extending substantially normal to the surface of the nose and additional flanking teeth on each side of the groove teeth being formed with portions extending diagonally from the base of the adjacent tooth and with their outer faces extending substantially normal to the surface of the nose from the edge of the teeth, whereby a central nose engaging portion is provided flanked by a plurality of teeth having a biting action to engage the nose and resist movement of the guard in either direction upon the nose.

In testimony whereof I affix my signature in presence of two witnesses.

OSWALD B. CARSON.

Witnesses:
CARROLL BAILEY,
JOSEPH J. DEMERS.

Copies of this patent may be obtained for five cents each, by addressing the "Commissioner of Patents, Washington, D. C."